US008169645B2

(12) United States Patent
Matsuura et al.

(10) Patent No.: US 8,169,645 B2
(45) Date of Patent: May 1, 2012

(54) PARTITIONED DUPLEX PRINTING METHOD BASED ON THE CAPACITY OF THE OUTPUT TRAY

(75) Inventors: Hiroki Matsuura, Kanagawa (JP); Yuichi Niwa, Kanagawa (JP); Katsumi Shimokawa, Kanagawa (JP); Masahiro Ogawa, Kanagawa (JP); Kenji Togashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 995 days.

(21) Appl. No.: 12/035,697

(22) Filed: Feb. 22, 2008

(65) Prior Publication Data
US 2008/0225330 A1    Sep. 18, 2008

(30) Foreign Application Priority Data

Mar. 7, 2007  (JP) .................. 2007-056921

(51) Int. Cl.
G06F 3/12 (2006.01)
(52) U.S. Cl. ........ 358/1.15; 358/1.1; 358/1.9; 358/1.14; 358/1.13; 355/23
(58) Field of Classification Search .......... 358/1.15, 358/1, 1.9, 1.14, 1.13; 355/23
See application file for complete search history.

(56) References Cited

U.S. PATENT DOCUMENTS

| 6,453,129 B1 * | 9/2002 | Simpson et al. ............. 399/23 |
| 2003/0038964 A1 * | 2/2003 | Ferlitsch ..................... 358/1.15 |
| 2006/0001686 A1 * | 1/2006 | Natori ........................... 347/16 |
| 2008/0013109 A1 * | 1/2008 | Chen et al. ................... 358/1.1 |
| 2008/0193182 A1 * | 8/2008 | Sasama ......................... 399/405 |

FOREIGN PATENT DOCUMENTS

| JP | 2001-205900 | 7/2001 |
| JP | 2003-95466 | 4/2003 |
| JP | 2005-181876 | 7/2005 |
| JP | 2006-18464 | 1/2006 |
| JP | 2007-18231 | 1/2007 |

OTHER PUBLICATIONS

Office Action issued Jun. 14, 2011, in Japan Patent Application No. 2007-056921.

* cited by examiner

*Primary Examiner* — Benny Tieu
*Assistant Examiner* — Paul F Payer
(74) *Attorney, Agent, or Firm* — Oblon, Spivak, McClelland, Maier & Neustadt, L.L.P.

(57) ABSTRACT

A printer includes a data obtaining unit, a storage unit, an engine, and a printing unit. The data obtaining unit obtains, from print data stored in the storage unit, print data for sheets less than the maximum number of sheets dischargeable to a discharge tray as target print data and sends the target print data to the engine via the printing unit. The target print data includes first print data of odd pages and second print data of even pages. After printing the first print data on one side of sheets fed from a feed tray and discharges the sheets onto the discharge tray, the engine prints the second print data on the other side of the sheets manually returned from the discharge tray to the feed tray.

8 Claims, 8 Drawing Sheets

PARTITIONED DUPLEX PRINTING METHOD BASED ON THE CAPACITY OF THE OUTPUT TRAY

CROSS-REFERENCE TO RELATED APPLICATIONS

The present application claims priority to and incorporates by reference the entire contents of Japanese priority document 2007-056921 filed in Japan on Mar. 7, 2007.

BACKGROUND OF THE INVENTION

1. Field of the Invention

The present invention relates to a printing apparatus and a printing method.

2. Description of the Related Art

In recent years, printing apparatuses are capable of double-sided printing for printing on both sides of a paper sheet to save paper resources.

Among the printing apparatuses that perform such double-sided printing is a printing apparatus that automatically reverses a sheet, and performs automatic double-sided printing on both sides of the sheet in sequence of pages. Moreover, there is a printing apparatus that performs manual double-sided printing by sequentially printing only images of odd pages of print data on one side of sheets and discharges onto a discharge tray. When the printing of the odd pages of the print data is finished, the other side of the sheets discharged on the discharge tray is set manually on a feed tray, a manual feed tray, and the like, as the print side. When instructed to print, the printing apparatus sequentially prints even pages of the print data on the other side of the sheets already printed on one side.

Japanese Patent Application Laid-Open No. 2006-18464 discloses a conventional printing apparatus that has such a manual double-sided printing function, and continuously prints one side of sheets while controlling a sequence of pages of print data. Upon completion of printing on one side of all the sheets, the other side of the sheets is set on the feed tray or the like as the print side. When instructed to print, the printing apparatus continuously prints the other side.

However, with the conventional printing apparatus, as shown in FIG. 10, regardless to the number of pages of the print data, all the pages to be printed are arranged to one side and the other side for double-sided printing. After one side of all sheets is continuously printed and the sheets are discharged on a discharge tray, the other side of the sheets already printed on one side is set on a feed tray as the print side and continuously printed. Accordingly, if the number of sheets printed with the print data does not exceed the maximum dischargeable number of sheets of the discharge tray, the print data can be printed on the sheets in the sequence of one side of a sheet, the other side, one side, . . . (continued) properly to both sides thereof in the sequence of the pages. However, if the number of sheets printed by the print data exceeds the maximum dischargeable number of sheets of the discharge tray, the sheets already printed on one side overflow and slide out from the discharge tray. Accordingly, problems occur such as the page sequence of the sheets already printed on one side gets messed up, making it unable to perform double-sided printing in the proper page sequence. Even if the pages are printed, it takes time to align pages, which causes poor workability. Moreover, the already-printed sheets slid out from the discharge tray may get lost or stolen. Although the security of information has been demanded in recent years, it may become a security hole.

SUMMARY OF THE INVENTION

It is an object of the present invention to at least partially solve the problems in the conventional technology.

According to an aspect of the present invention, there is provided a printing apparatus that prints print data on a recording medium fed from a feeding unit and discharges the recording medium printed with the print data onto a discharge tray based on capacity of the discharge tray. The printing apparatus includes a storage unit that stores therein print data; an obtaining unit that obtains, from the print data stored in the storage unit, print data of pages corresponding to number of recording media equal to or less than a threshold as target print data, the threshold corresponding to the capacity of the discharge tray, and the target print data including first print data of odd pages and second print data of even pages; and a printing unit that sequentially prints the first print data on a first side of recording media and discharges the recording media onto the discharge tray, and sequentially prints the second print data on a second side of the recording media manually returned from the discharge tray to the feeding unit.

According to another aspect of the present invention, there is provided a printing method applied to a printing apparatus that prints print data on a recording medium fed from a feeding unit and discharges the recording medium printed with the print data onto a discharge tray based on capacity of the discharge tray. The printing method includes storing print data; obtaining, from the print data stored in the storage unit, print data of pages corresponding to number of recording media equal to or less than a threshold as target print data, the threshold corresponding to the capacity of the discharge tray, and the target print data including first print data of odd pages and second print data of even pages; first printing the first print data on a first side of recording media; discharging the recording media onto the discharge tray; and second printing the second print data on a second side of the recording media manually returned from the discharge tray to the feeding unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
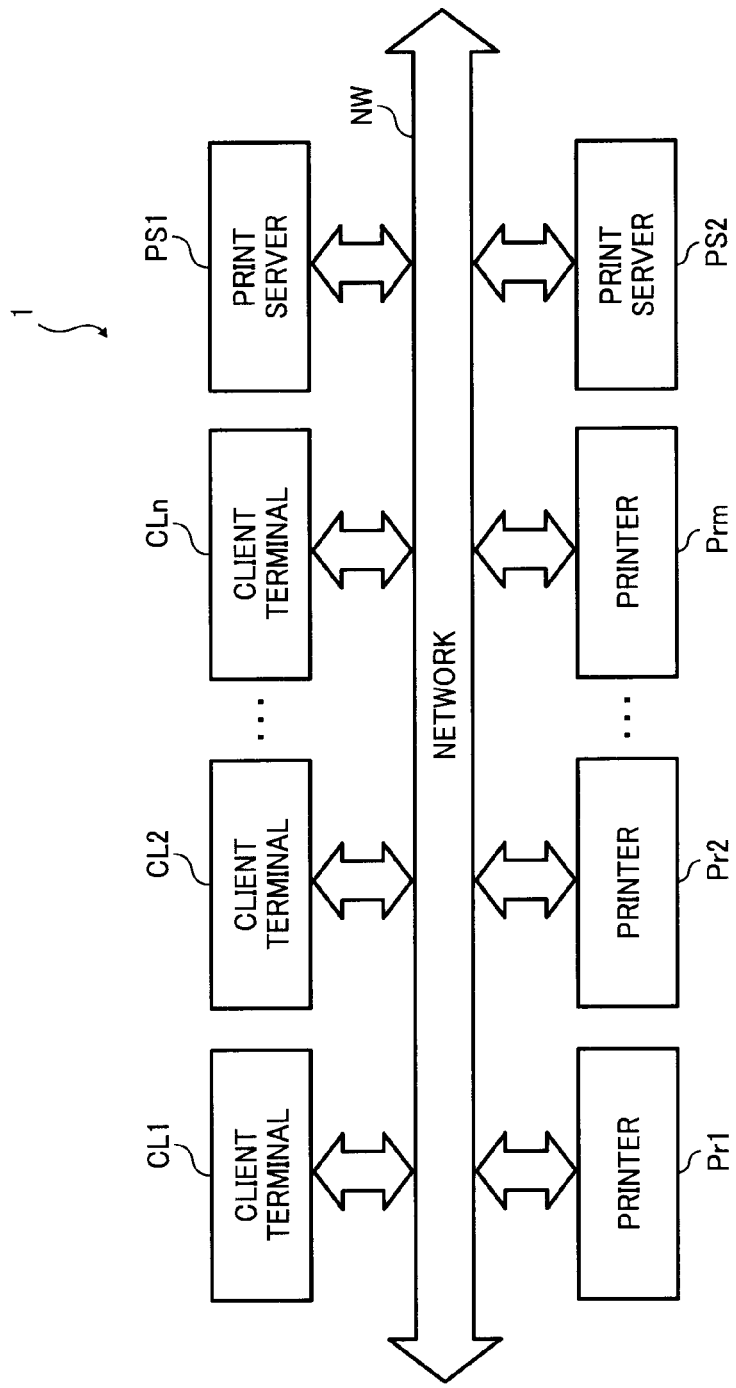
FIG. 1 is a schematic diagram of a printing system according to an embodiment of the present invention.

FIG. 1 is a schematic diagram of a printing system 1 according to an embodiment of the present invention. The printing system 1 includes a plurality of client terminals CL1 to CLn, a plurality (e.g., two in FIG. 1) of print servers PS1 and PS2, and a plurality of printers Pr1 to Prm, which are connected to a network NW such as local area network (LAN) or Ethernet (trademark). The network NW can be wired or wireless.

Figure 2:
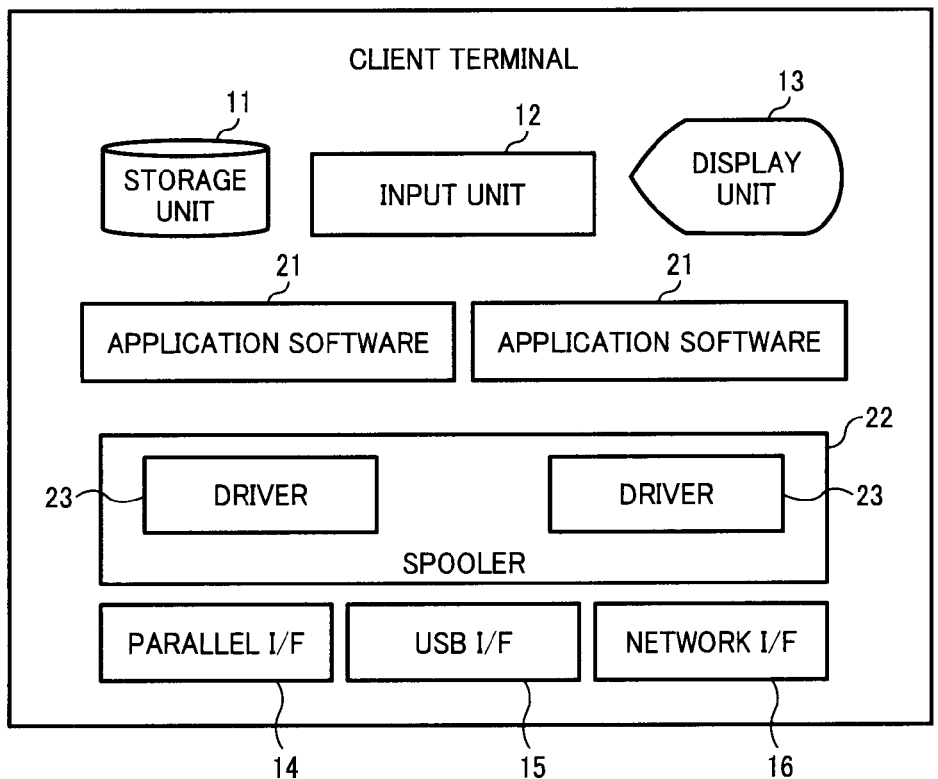
FIG. 2 is a block diagram of a client terminal shown in FIG. 1.

A personal computer with a typical hardware configuration, for example, can be used as the client terminal (CL1 to CLn). FIG. 2 is a block diagram of the client terminal (CL1 to CLn). The client terminal (CL1 to CLn) includes a storage unit 11, an input unit 12, a display unit 13, a parallel interface (I/F) 14, a universal serial bus (USB) I/F 15, and a network I/F 16. Moreover, software such as a plurality of applications (application software) 21 and a spooler 22 are installed on its operating system (OS) such as Windows (trademark). The spooler 22 includes a driver (printer driver) 23 that corresponds to the printers Pr1 to Prm connected via the network NW.

The storage unit 11 includes a non-volatile memory such as a hard disk and a volatile memory such as a random access memory (RAM), and stores therein software such as the OS, the application software 21, and the spooler 22, and image data and the like created by various system data and the application software 21.

Examples of the input unit 12 include a pointing device, a keyboard, a touch panel, a mouse, and an audio input device, through which input is provided to operate the client terminal (CL1 to CLn).

Examples of the display unit 13 include a cathode ray tube (CRT), a liquid crystal display (LCD), a light emitting diode (LED). The display unit 13 displays and outputs various information.

The parallel I/F 14 is an input and output interface based on IEEE 1284 standard. The USB I/F 15 is an input and output interface based on USB 1.0 or USB 2.0 standards. A USB device (not shown) such as a USB memory is connected to the USB I/F 15 via a USB code. The USB I/F 15 exchanges various data with the USB device. The network I/F 16 is connected to the network NW, and transmits and receives print data and a command to and from equipment on the network NW.

The application software 21 includes document creation software, graphic creation software, spread sheet software, data base software installed on the OS. The spooler 22 is a software module that manages a printing function of the OS, and the driver 23 operates as part of the spooler 22.

When the application software 21 issues an instruction to print an image created by the application software 21, the client terminal (CL1 to CLn) sends image data and print-setting data to the driver 23 of the spooler 22 via the OS.

The driver 23 is compatible with the printers Pr1 to Prm, and generates a command of information (print data) that the printer (Pr1 to Prm) interprets to print an image. The driver 23 generates print data for the printer (Pr1 to Prm) from image data and setting data received from the application software 21, and transmits the print data and the setting data (print settings) to the printer (Pr1 to Prm) via the network NW.

Figure 3:
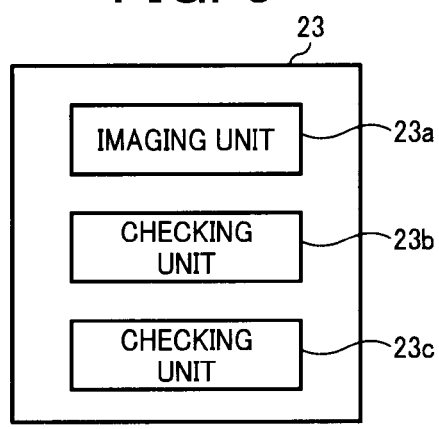
FIG. 3 is a functional block diagram of a driver shown in FIG. 2.

FIG. 3 is a functional block diagram of the driver 23. The driver 23 includes an imaging unit 23a and checking units 23b and 23c.

The checking units 23b and 23c check the number of pages, the type of a recording medium (sheet), and the like with respect to image data from the application software 21.

The imaging unit 23a converts the image data from the application software 21 to print data interpretable by the printer (Pr1 to Prm), and sends the spooler 22 the print data with a printer job language (PJL) that specifies print settings such as a sheet type and whether double-sided printing is required.

Based on printer configuration information held by the spooler 22, the print data and the PJL are sent from the network I/F 16 to the printer (Pr1 to Prm) via the network NW when a proper input and output interface, i.e., the printer (Pr1 to Prm) is connected through the network NW as described above.

The printer (Pr1 to Prm) performs printing by interpreting the print data, and forms a proper image on a sheet. When manual double-sided printing is specified by the PJL, the printer (Pr1 to Prm) continuously prints odd pages up to the maximum dischargeable number of sheets described later on one side of sheets and discharges the sheets onto a discharge tray. When the sheets are placed on a feed tray so that the other side of the sheets with one side already printed is set as the print side, the printer (Pr1 to Prm) continuously prints even pages on the other side. Accordingly, the printer (Pr1 to Prm) implements a manual double-sided printing function of printing both sides of sheets.

Figure 4:
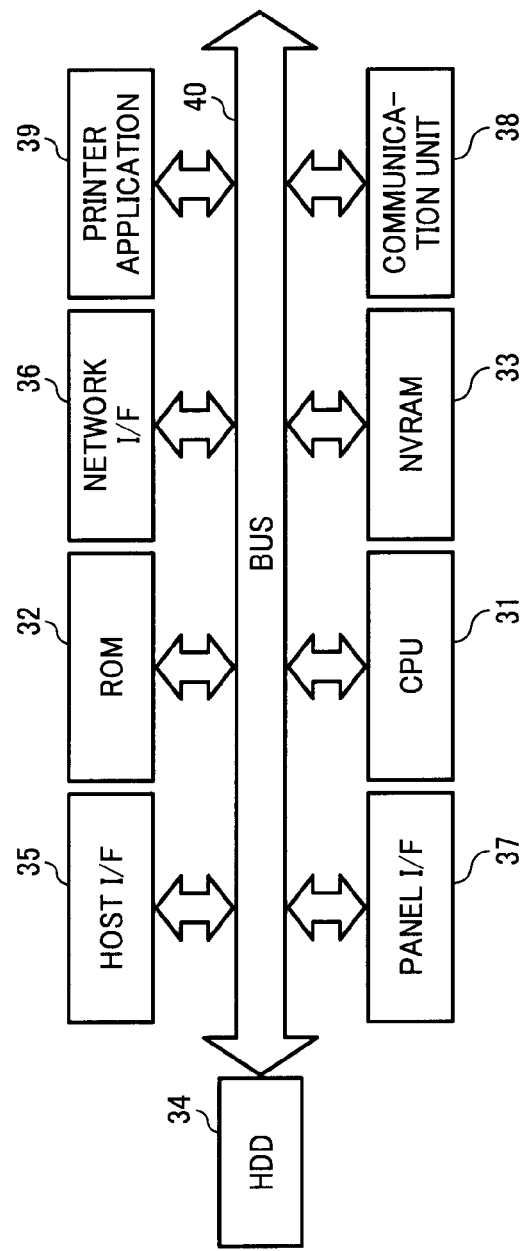
FIG. 4 is a block diagram of a printer shown in FIG. 1.

The printer (Pr1 to Prm), as shown in FIG. 4, includes a central processing unit (CPU) 31, a read only memory (ROM) 32, a nonvolatile random access memory (NVRAM) 33, a hard disk (HDD) 34, a host I/F 35, a network I/F 36, a panel I/F 37, a communication unit 38, and an application (printer application) 39. The respective units are connected by a bus 40.

Figure 5:
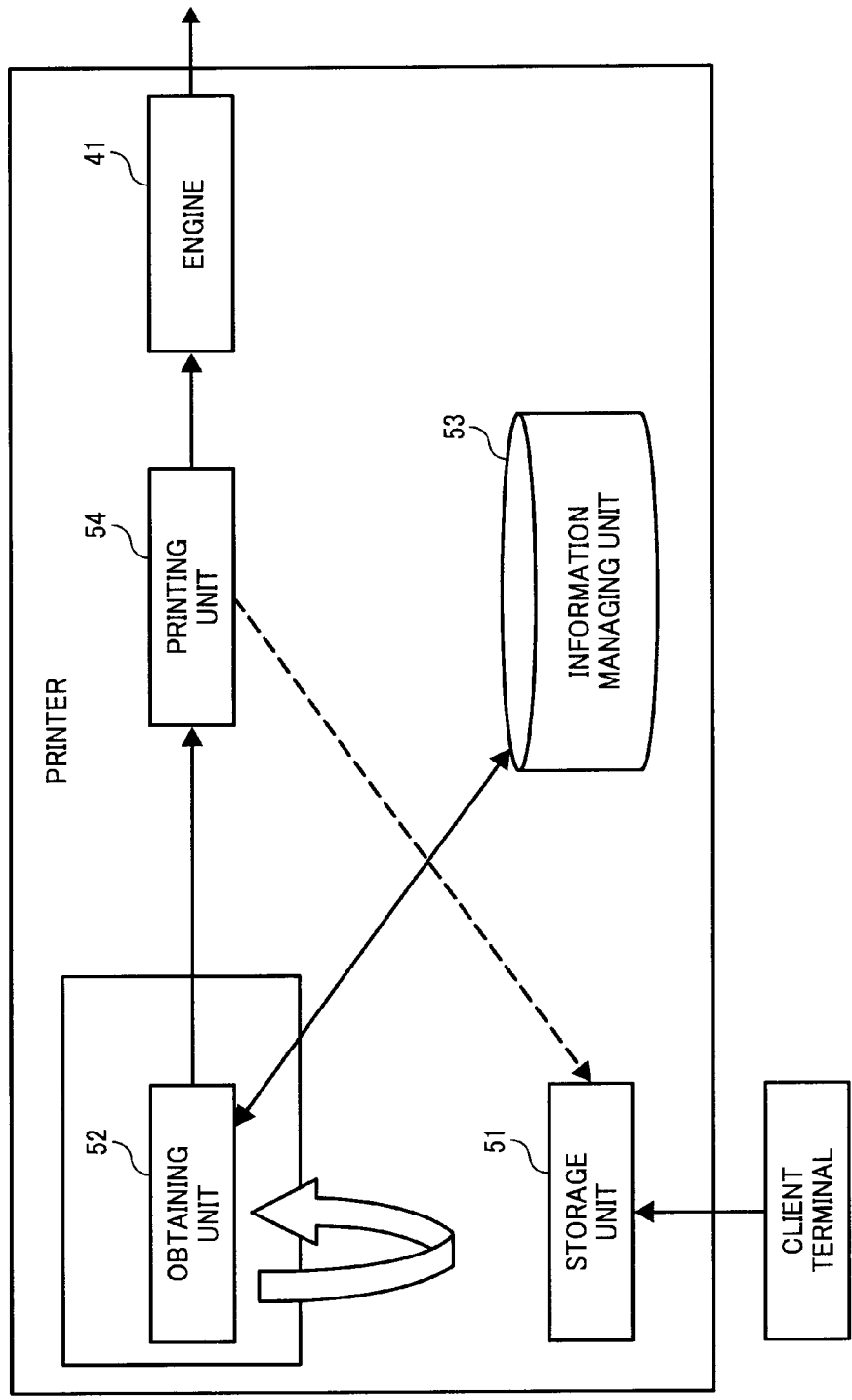
FIG. 5 is a functional block diagram of the printer.

FIG. 5 is a functional block diagram of the printer (Pr1 to Prm). The printer (Pr1 to Prm) includes an engine 41, a storage unit 51, a data obtaining unit 52, an information managing unit 53, and a printing unit 54.

The engine 41 forms, based on image data and a control signal, an image (performs printing) by a predetermined printing method such as an electrophotographic method and an ink-jet method. The engine 41 includes a feed tray on which a plurality of sheets for printing are set, a printing unit that prints and outputs an image on a sheet from the feed tray based on image data, and a discharge tray to which the sheets already printed by the printing unit are discharged and a plurality of numbers of sheets can be stacked (dischargeable). The maximum dischargeable number of sheets that can be stacked on the discharge tray varies depending on the sheet type, and the number of sheets that can be printed continuously by manual double-sided printing is determined by the maximum dischargeable number of sheets.

The hard disk 34 stores therein various types of data such as print data under the control of the CPU 31.

The client terminal (CL1 to CLn) is connected to the host I/F 35, when the client terminal (CL1 to CLn), i.e., a host, is connected directly to the printer (Pr1 to Prm) without via the network NW. The host I/F 35 receives a control signal and data of the client terminal (CL1 to CLn), and delivers a status signal from the printer (Pr1 to Prm) to the client terminal (CL1 to CLn).

The network NW is connected to the network I/F 36, and the network I/F 36 receives the control signal and the data sent from the client terminal (CL1 to CLn) to the printer (Pr1 to Prm) via the network NW. The network I/F 36 also delivers the status signal from the printer (Pr1 to Prm) to the client terminal (CL1 to CLn) via the network NW.

The ROM 32 stores therein a computer program to process and manage data, and controls peripheral modules. More particularly, the ROM 32 stores therein various computer programs such as a basic processing program for the printer (Pr1 to Prm), a computer program (hereinafter, "manual double-sided print controlling program") described later, and the like. The ROM 32 also stores therein various data required to execute the respective computer programs. The manual double-sided print controlling program is not necessarily stored in the ROM 32 in advance. When the ROM 32 is writable, the manual double-sided print controlling program can be stored in a recording medium such as a compact disc (CD), a compact disc rewritable (CD-RW), and a flexible disk, and read therefrom to be stored in the ROM 32. The printer (Pr1 to Prm) can implement the printing method of the embodiment by executing the manual double-sided print controlling program.

An operation panel, i.e., a display unit (not shown) is connected to the panel I/F 37. The operation panel includes various operation keys, particularly a start key to start printing, required to operate the printer (Pr1 to Prm), for example, to switch modes, fonts, and the like on the printer (Pr1 to Prm). The operation panel also includes a display (for example, a liquid crystal display) that displays a state of the printer (Pr1 to Prm). The panel I/F 37 exchanges signals between the CPU 31 and the operation panel.

The CPU 31 controls the respective units of the printer (Pr1 to Prm) to perform printing including manual double-sided print processing, described later, using the NVRAM 33 as a work memory based on the computer program stored in the ROM 32.

The NVRAM 33 is used as a work memory for the CPU 31, and also used as a buffer that manages and temporarily stores therein the print data from the client terminal (CL1 to CLn) per page unit, a bit map memory that stores therein video data that the data stored in the buffer is converted into an actual image pattern (print pattern), and the like.

The NVRAM 33 is a memory that holds stored contents even when the power of the printer (Pr1 to Prm) is turned off. The NVRAM 33 stores therein data required to be held even when the power of the printer (Pr1 to Prm) is turned off. More particularly, the NVRAM 33 stores therein various data, configuration information, and the like used in manual double-sided print processing under the control of the CPU 31.

A communication line such as a telephone line is connected to the communication unit 38. The communication unit 38 communicates various data with other apparatuses and the like via the communication line under the control of the CPU 31.

The printer application 39 executes an application to operate the printer (Pr1 to Prm) under the control of the CPU 31.

The print server (PS1, PS2), when print data and PJL are sent from the client terminal (CL1 to CLn) via the network NW, receives the print data and the like, and, after accumulating the print data in an accumulation memory, transmits the print data to the specified printer (Pr1 to Prm) to cause the printer (Pr1 to Prm) to perform printing.

The storage unit 51 includes the HDD 34, and receives and stores therein the print data and the PJL of print settings sent from the client terminal (CL1 to CLn) via the network NW. The PJL is sent with the print data, and when manual double-sided printing is specified by the PJL, the print data of one side (print data of odd pages) is transmitted continuously from the client terminal (CL1 to CLn). When the transmission of the print data of one side is finished, the other side (print data of even pages) is transmitted continuously. Not only specification of manual double-sided printing, but information on print settings such as the sheet type is described in the PJL. The storage unit 51 sends the print settings in the PJL to the data obtaining unit 52 and the printing unit 54.

The information managing unit 53 stores therein in advance maximum dischargeable sheet information including the sheet type and the maximum dischargeable number of sheets in association with each other. The data obtaining unit 52 refers to the maximum dischargeable sheet information based on the sheet type, and obtains the maximum dischargeable number of sheets that corresponds to the sheet type.

The data obtaining unit 52 monitors the storage unit 51 and checks a relationship between the maximum dischargeable number of sheets that corresponds to the sheet type and a total pages of print data. The data obtaining unit 52 divides print data in the storage unit 51, as required, to obtain print data of pages equal to or less than the maximum dischargeable number of sheets. The data obtaining unit 52 then sends the obtained print data to the printing unit 54 to print it.

The data obtaining unit 52 and the information managing unit 53 in combination function to set the maximum dischargeable number of sheets depending on the sheet type included in print settings received from the client terminal (CL1 to CLn).

The printing unit 54 converts the print data to a video signal according to the print settings, and outputs it to the engine 41. The engine 41 prints an image on a sheet of the sheet type specified by the video signal and the control signal from the printing unit 54. The printing unit 54 and the engine 41 in combination function as a printing unit. Specifically, the engine 41 continuously prints the odd pages of print data to be printed received from the printing unit 54 on one side of sheets fed from the feed tray, and discharges the sheets onto the discharge tray. Then, the engine 41 continuously prints the even pages of the print data on the other side of the sheets that have already been printed on one side and manually returned to the feed tray from the discharge tray.

The client terminal (CL1 to CLn) has, as a function of the driver 23 or as a specific application function, a function of managing the maximum dischargeable number of sheets that defines the number of continuous printable sheets corresponding to the sheet type through manual double-sided printing. Depending on settings specified through the user interface (UI) and the like of the driver 23, the maximum dischargeable number of sheets by the printer (Pr1 to Prm) corresponding to the type of sheets to which print data is to be printed is set. By storing the maximum dischargeable number of sheets with respect to each sheet type and the sheet type for the respective printers Pr1 to Prm as maximum dischargeable sheet information, the client terminal (CL1 to CLn) can set the maximum dischargeable number of sheets for current printing by referring to the maximum dischargeable sheet information depending on print settings. The client terminal (CL1 to CLn) can obtain the type of sheets set at the feed tray from the printer (Pr1 to Prm) to set the maximum dischargeable number of sheets corresponding to the sheet type based on the maximum dischargeable sheet information. Before transmitting print data to the printer (Pr1 to Prm), the client terminal (CL1 to CLn) can notify the printer (Pr1 to Prm), i.e., a printing destination, of the sheet type specified by print settings and request for information on the maximum dischargeable number of sheets corresponding to the sheet type. In this case, the printer (Pr1 to Prm) notifies the client terminal (CL1 to CLn) of the maximum dischargeable number of sheets based on the maximum dischargeable sheet information retained by the information managing unit 53. Thus, the client terminal (CL1 to CLn) sets the maximum dischargeable number of sheets for current printing, and adds it to the PJL to transmit it with print data to the printer (Pr1 to Prm).

The client terminal (CL1 to CLn) can obtain the maximum dischargeable number of sheets and the sheet type from the printer (Pr1 to Prm) by obtaining management information base (MIB) information from a simple network management protocol (SNMP).

Whether to set the maximum dischargeable number of sheets by the sheet type can be selected on both the client terminal (CL1 to CLn) side and printer (Pr1 to Prm) side.

The printer (Pr1 to Prm) of the embodiment, in manual double-sided printing, controls manual double-sided printing to prevent already-printed sheets from overflowing from the discharge tray by separately printing a number of pages of print data based on the maximum dischargeable number of sheets and a total pages of the print data.

In the control process of manual double-sided printing, the printer (Pr1 to Prm) can set the maximum dischargeable number of sheets and manage print data. The client terminal (CL1 to CLn) can also set the maximum dischargeable number of sheets and manages transmission of print data.

Figure 6:
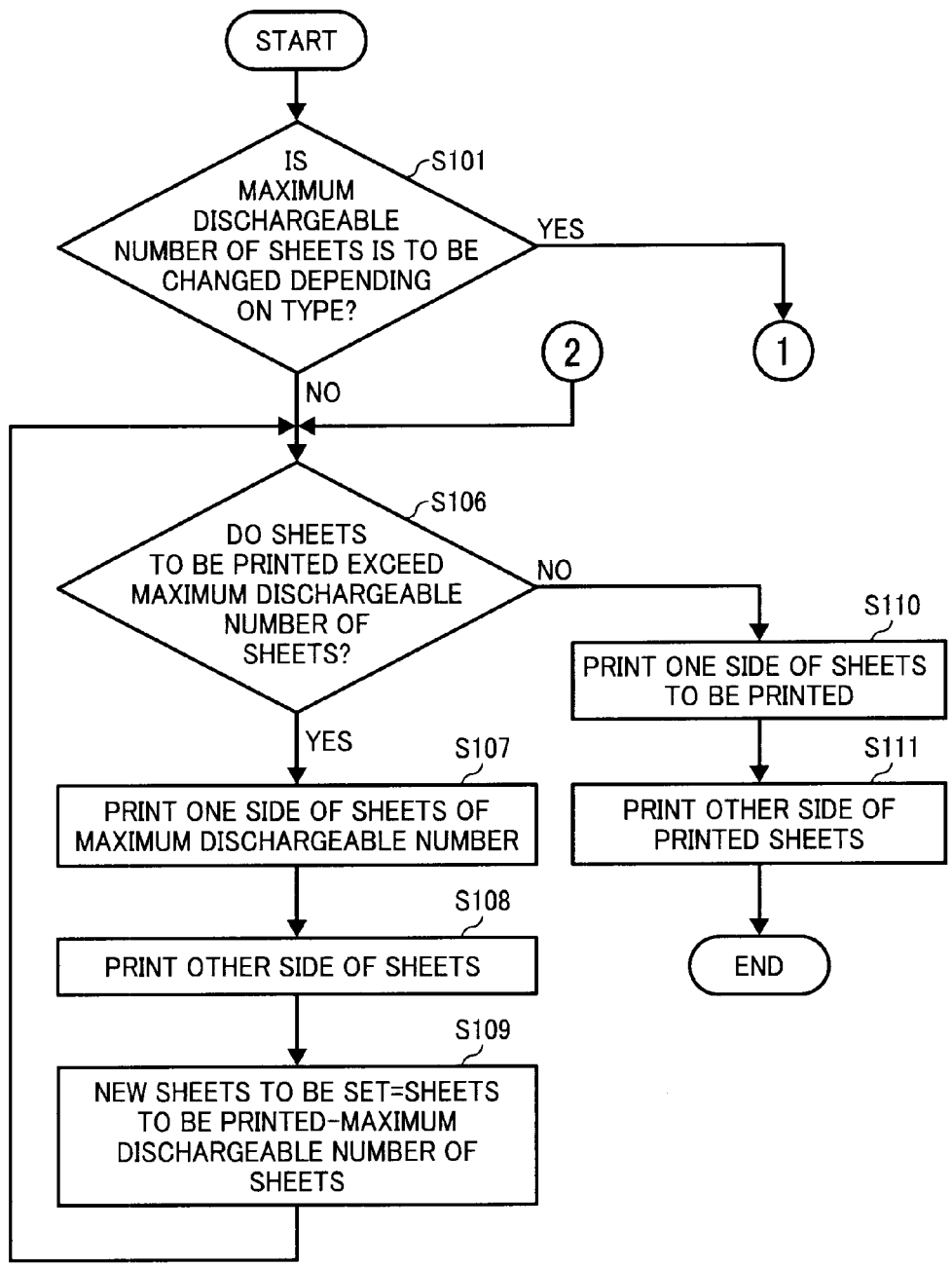
FIG. 6 is a flowchart of a control process of manual double-sided printing performed by the printing system.
Figure 7:
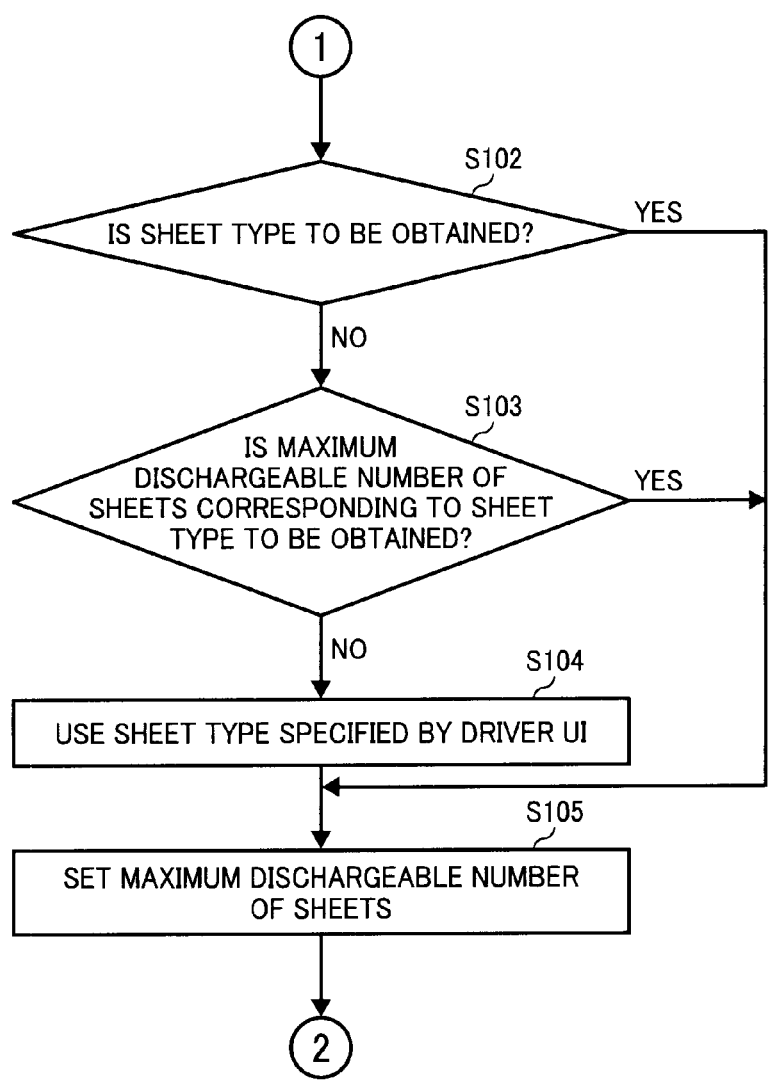
FIG. 7 is a flowchart of a process subsequent to the control process shown in FIG. 6.

The following is a description with reference to FIGS. 6 and 7 of the case where the printer (Pr1 to Prm) sets the maximum dischargeable number of sheets and manages print data. In the following explanation, an A4 plain sheet and manual double-sided printing is set by the PJL, and a total of 250 pages of print data (corresponding to 125 sheets to be printed) is transmitted from the client terminal (CL1 to CLn). The maximum dischargeable number of sheets of the A4 plain sheet at the printer (Pr1 to Prm) is, for example, 100 sheets.

Figure 8:
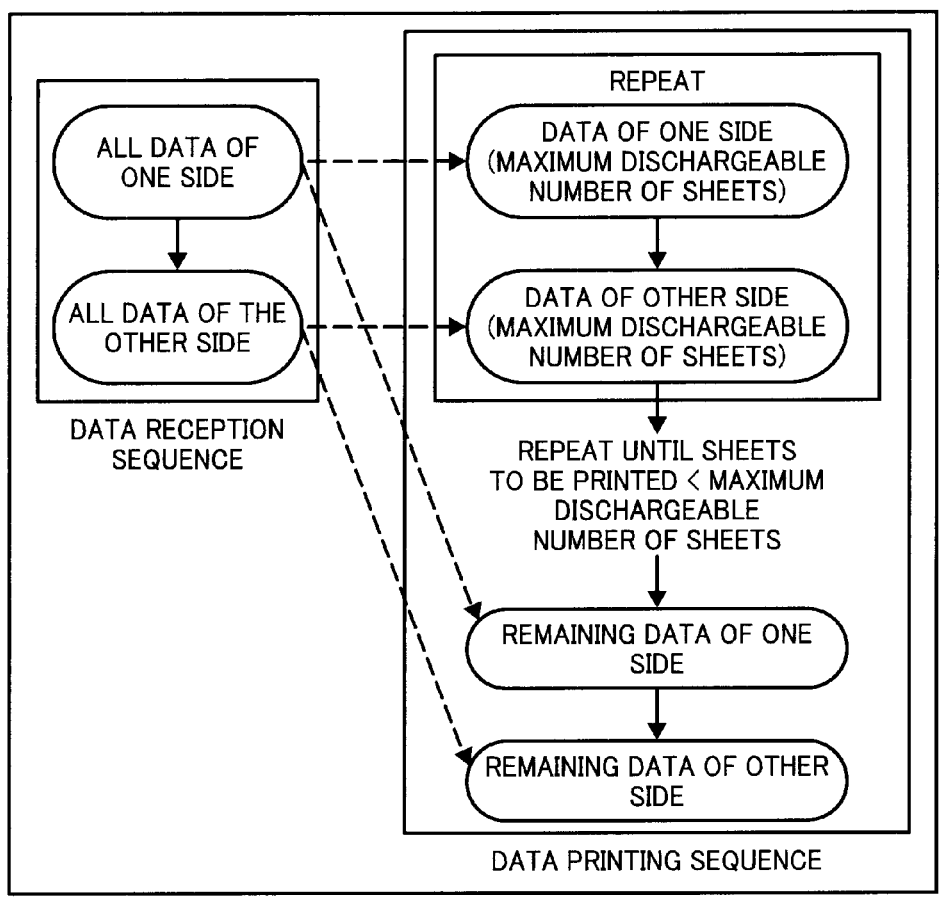
FIGS. 8 and 9 are schematic diagrams for explaining data reception sequence and printing sequence upon manual double-sided printing.

In the control process of manual double-sided printing in which the printer (Pr1 to Prm) sets the maximum dischargeable number of sheets and manages the print data, the driver 23 of the client terminal (CL1 to CLn) transmits print data and PJL to the printer (Pr1 to Prm). When manual double-sided printing and the sheet type are specified by the PJL as print settings, as shown in FIG. 8, all print data of one side corresponding to odd pages (print data of 125 odd pages in this example) is transmitted with information indicating the end position of one-side printing added to the end of the print data for one side. Upon completion of the transmission of all the print data for one side, all print data for the other side corresponding to even pages (print data of 125 even pages) is transmitted.

As shown in FIG. 6, upon receiving print data and PJL, the printer (Pr1 to Prm) stores the print data in the storage unit 51, and checks whether the maximum dischargeable number of sheets is to be changed depending on the sheet type (step S101). Whether to change the maximum dischargeable number of sheets depending on the sheet type can be set by key operation and the like on the operation panel.

If the maximum dischargeable number of sheets is to be changed depending on the sheet type (Yes at step S101), as shown in FIG. 7, the printer (Pr1 to Prm) checks whether the type of sheets set on the feed tray is to be obtained (step S102). If the type of sheets on the feed tray is not to be obtained (No at step S102), the printer (Pr1 to Prm) checks whether the maximum dischargeable number of sheets that corresponds to the already-known type of sheets on the feed tray is to be obtained (step S103).

If the maximum dischargeable number of sheets that corresponds to the sheet type is not to be obtained (No at step S103), the printer (Pr1 to Prm) obtains the sheet type specified thorugh the user interface (UI) of the driver 23 of the client terminal (CL1 to CLn) and set in the PJL (step S104). The printer (Pr1 to Prm) then refers to the maximum dischargeable sheet information retained by the information managing unit 53 based on the obtained sheet type, and sets the maximum dischargeable number of sheets (step S105).

When the type of sheets fed from the feed tray is obtained at step S102, the printer (Pr1 to Prm) refers to the maximum dischargeable sheet information retained by the information managing unit 53 based on the obtained sheet type, and sets the maximum dischargeable number of sheets (step S105).

When the maximum dischargeable number of sheets that corresponds to the sheet type is obtained at step S103, the printer (Pr1 to Prm) refers to the maximum dischargeable sheet information retained by the information managing unit 53 based on the obtained sheet type, and sets the maximum dischargeable number of sheets (step S105).

If the maximum dischargeable number of sheets cannot be determined, the maximum dischargeable number of sheets set by default in advance is set.

When the maximum dischargeable number of sheets (100 sheets in this example) is set as above, the printer (Pr1 to Prm) checks whether sheets to be printed exceed the maximum dischargeable number of sheets (step S106). The number of sheets to be printed herein is 250 sheets, and the maximum dischargeable number of sheets is 100 sheets, i.e., the number of sheets to be printed exceeds the maximum dischargeable number of sheets. Accordingly, the printer (Pr1 to Prm) first continuously prints odd pages on one side of sheets of the maximum dischargeable number (step S107). In other words, the data obtaining unit 52 obtains print data corresponding to one side of the maximum dischargeable number of sheets (100 sheets), i.e., print data of 100 odd pages, from the storage unit 51, and sends the print data to the printing unit 54. The printing unit 54 converts the print data to a video signal, and sends it to the engine 41 with a control signal. The engine 41 continuously prints one side of sheets from the feed tray up to the maximum dischargeable number based on the video signal and the control signal, and discharges and stacks the already-printed sheets on the discharge tray.

Upon completion of printing the odd pages on one side of sheets of the maximum dischargeable number, the printer (Pr1 to Prm) waits until the sheets with one side already printed on the discharge tray are placed on the feed tray so that the other side of the sheets is set as the print side. When the start key is pressed, the printer (Pr1 to Prm) continuously prints even pages on the other side of the sheets (step S108). Specifically, the data obtaining unit 52 periodically queries the printing unit 54 whether the printing has finished. Upon receipt of notification that the printing has finished, the data obtaining unit 52 waits until the sheets with one side already printed on the discharge tray are placed on the feed tray so that the other side of the sheets is set as the print side. When the start key is pressed, the data obtaining unit 52 obtains print data (print data of 100 even pages) corresponding to the other side of the maximum dischargeable number of sheets (100 sheets) from the storage unit 51, and sends the print data to the printing unit 54. The printing unit 54 converts the print data to a video signal, and sends it to the engine 41 with a control signal. The engine 41 continuously prints the other side of the sheets from the feed tray up to the maximum dischargeable number based on the video signal and the control signal, and discharges and stacks the already-printed sheets on the discharge tray. Whether the already-printed sheets on the discharge tray are reversed and set on the feed tray is determined, for example, based on a detection result obtained by a sensor provided to the discharge tray and the feed tray.

Upon completion of the printing of the other side, the data obtaining unit 52 sets the number of new sheets to be printed by subtracting the maximum dischargeable number of sheets from the sheets to be printed (step S109). Returning to step S106, the data obtaining unit 52 checks whether the number of sheets to be printed exceeds the maximum dischargeable number of sheets (step S106).

At this point, 200 pages out of the total of 250 pages has been printed. The remaining are 50 pages, i.e., 25 sheets are yet to be printed. Because the number of sheets to be printed is less than the maximum dischargeable number of sheets, the printer (Pr1 to Prm) continuously prints remaining pages on one side of sheets (step S110). In other words, the data obtaining unit 52 obtains print data of the remaining 25 pages (remaining 25 odd pages) from the storage unit 51, and sends it to the printing unit 54. The printing unit 54 converts the print data to a video signal, and sends it to the engine 41 with a control signal. The engine 41 then continuously prints one side of sheets from the feed tray up to the maximum dischargeable number of sheets based on the video signal and the control signal, and discharges the already-printed sheet onto the discharge tray.

upon completion of printing the remaining odd pages on one side of sheets, the printer (Pr1 to Prm) waits until the sheets with one side already printed on the discharge tray are placed on the feed tray so that the other side of the sheets is set as the print side. Then, the printer (Pr1 to Prm) continuously prints even pages on the other side of sheets (step S111). In other words, when the printing of one side is finished, the data obtaining unit 52 waits until the sheets with one side already printed on the discharge tray are placed on the feed tray so that the other side of the sheets is set as the print side. When the start key is pressed, the data obtaining unit 52 obtains print data (print data of remaining 25 even pages) corresponding to the other side of the sheets to be printed (25 sheets) from the storage unit 51, and sends it to the printing unit 54. The printing unit 54 converts the print data to a video signal, and sends it to the engine 41 with a control signal. The engine 41 continuously prints the other side of the sheets from the feed tray up to the maximum dischargeable number based on the video signal and the control signal, and discharges the already-printed sheets onto the discharge tray.

FIG. 8 is a schematic diagram for explaining data reception sequence and printing sequence upon manual double-sided printing where the printer (Pr1 to Prm) sets the maximum dischargeable number of sheets. In manual double-sided printing, as shown in FIG. 8, the printer (Pr1 to Prm) prints one side, the other side, one side, . . . (continued) up to the maximum dischargeable number of sheets (steps S106 to S109) until the number of remaining sheets to be printed becomes less than the maximum dischargeable number of sheets. When the number of sheets to be printed becomes equal to or less than the maximum dischargeable number of sheets, the printer (Pr1 to Prm) prints one side and the other side of the remaining sheets to be printed.

The following is a description with reference to FIGS. 6 and 7 of the case where the client terminal (CL1 to CLn) sets the maximum dischargeable number of sheets and manages print data. In the following explanation, for example, an A4 thick sheet is used, a total of 500 pages of print data (250 sheets) is to be printed, and the maximum dischargeable number of sheets is 80. The driver 23 has the function that implements the process of the embodiment.

In other words, as shown in FIG. 6, the client terminal (CL1 to CLn) checks whether the maximum dischargeable number of sheets is set to be changed depending on the sheet type according to settings specified through the user interface and the like of the driver 23 (step S101). If the maximum dischargeable number of sheets is set to be changed depending on the sheet type (Yes at step S101), as shown in FIG. 7, the client terminal (CL1 to CLn) checks whether the sheet type is to be obtained from the printer (Pr1 to Prm) (step S102).

If the sheet type is not to be obtained from the printer (Pr1 to Prm) (No at step S102), the client terminal (CL1 to CLn) checks whether the maximum dischargeable number of sheets that corresponds to the sheet type is to be obtained from the printer (Pr1 to Prm) (step S103). If the maximum dischargeable number of sheets is not to be obtained from the printer (Pr1 to Prm) (No at step S103), the client terminal (CL1 to CLn) obtains the sheet type specified by the user interface (UI) of the driver 23 (step S104). The client terminal (CL1 to CLn) then refers to maximum dischargeable sheet information stored therein based on the obtained sheet type, and sets the maximum dischargeable number of sheets (step S105).

When the sheet type is to be obtained from the printer (Pr1 to Prm) at step S102, the client terminal (CL1 to CLn) obtains the type of sheets set on the feed tray from MIB information obtained from the printer (Pr1 to Prm). Then, the client terminal (CL1 to CLn) sets the maximum dischargeable number of sheets by referring to the maximum dischargeable sheet information stored therein based on the obtained sheet type (step S105).

When obtaining the maximum dischargeable number of sheets that corresponds to the sheet type from the printer (Pr1 to Prm) using the MIB information at step S103, the client terminal (CL1 to CLn) notifies a printing destination, i.e., the printer (Pr1 to Prm), of the sheet type specified by the print settings, and requests for information on the maximum dischargeable number of sheets that corresponds to the sheet type. Then, the printer (Pr1 to Prm) obtains the maximum dischargeable number of sheets by referring to the maximum dischargeable sheet information retained by the information managing unit 53 based on the notified sheet type, and transmits this information to the client terminal (CL1 to CLn). The client terminal (CL1 to CLn) sets the maximum dischargeable number of sheets for current manual double-sided printing based on the information received from the printer (Pr1 to Prm) (step S105).

If the maximum dischargeable number of sheets cannot be determined, the maximum dischargeable number of sheets set by default in advance is set.

When the maximum dischargeable number of sheets (80 sheets in the example) is set as above, the client terminal (CL1 to CLn) checks whether the sheets to be printed exceed the maximum dischargeable number of sheets (step S106). The number of sheets to be printed herein is 250 sheets (total of 500 pages), and the maximum dischargeable number of sheets is 80 sheets. Because the number of sheets to be printed exceeds the maximum dischargeable number of sheets, the client terminal (CL1 to CLn) continuously transmits print data of odd pages to be printed on one side of sheets of the maximum dischargeable number. The printer (Pr1 to Prm) then continuously prints the print data on one side of the sheets (step S107). In other words, the client terminal (CL1 to CLn) knows the maximum dischargeable number of sheets of the printer (Pr1 to Prm), and therefore, transmits print data corresponding to one side of sheets (print data of 80 odd pages) up to the maximum dischargeable number of sheets (80 sheets) to the printer (Pr1 to Prm). Upon receipt of the print data, the storage unit 51 stores therein the print data. The data obtaining unit 52 then obtains the print data from the storage unit 51, and sends it to the printing unit 54. The printing unit 54 converts the print data to a video signal, and sends it to the engine 41 with a control signal. The engine 41 continuously prints one side of sheets from the feed tray up to the maximum dischargeable number based on the video signal and the control signal, and discharges and stacks the already-printed sheets onto the discharge tray.

Upon completion of transmission of the print data of the odd pages to be printed on one side of sheets of the maximum dischargeable number, the client terminal (CL1 to CLn) continuously transmits print data corresponding to the other side of the sheets (print data of even pages) of the maximum dischargeable number. Upon completion of printing one side of sheets of the maximum dischargeable number, the printer (Pr1 to Prm) waits until the sheets with one side already printed on the discharge tray are placed on the feed tray so that the other side of the sheets is set as the print side. When the start key is pressed, the printer (Pr1 to Prm) continuously prints even pages on the other side of the sheets of the maximum dischargeable number (step S108). Specifically, upon receipt of print data for the other side from the client terminal (CL1 to CLn), the storage unit 51 of the printer (Pr1 to Prm) stores therein the print data. The data obtaining unit 52 periodically queries whether the printing has finished to the printing unit 54. Upon receipt of notification that the printing has finished, the data obtaining unit 52 waits until the sheets with one side already printed on the discharge tray are placed on the feed tray so that the other side of the sheets is set as the print side. When the start key is pressed, the data obtaining unit 52 obtains print data (print data of 80 even pages) corresponding to the other side of the maximum dischargeable number of sheets (80 sheets) from the storage unit 51, and sends the print data to the printing unit 54. The printing unit 54 converts the print data to a video signal, and sends it to the engine 41 with a control signal. The engine 41 then continuously prints the other side of the sheets from the feed tray up to the maximum dischargeable number based on the video signal and the control signal, and discharges and stacks the already-printed sheets onto the discharge tray.

Upon completion of transmission of the print data of the other side up to the maximum dischargeable number of sheets, the client terminal (CL1 to CLn) sets the number of new sheets to be printed by subtracting the maximum dischargeable number of sheets from the sheets to be printed (step S109). Returning to step S106, the client terminal (CL1 to CLn) checks whether the number of sheets to be printed exceeds the maximum dischargeable number of sheets (step S106).

At this point, 80 sheets (160 pages) out of the total of 250 sheets (500 pages) to be printed has been printed. The remaining are 340 pages, i.e., 170 sheets are yet to be printed. The number of sheets to be printed exceeds the maximum dischargeable number of sheets: 80 sheets. As above, the client terminal (CL1 to CLn) transmits print data for one side up to the maximum dischargeable number of sheets to print it at the printer (Pr1 to Prm), and then transmits print data for the other side to print it at the printer (Pr1 to Prm) (steps S107 and S108).

Upon completion of transmission of the print data for the other side, the client terminal (CL1 to CLn) sets the number of new sheets to be printed by subtracting the maximum dischargeable number of sheets from the sheets to be printed (step S109). Returning to step S106, the client terminal (CL1 to CLn) checks whether the number of sheets to be printed exceeds the maximum dischargeable number of sheets (step S106).

At this point, 160 sheets (320 pages) out of the total of 250 sheets (500 pages) to be printed has been printed, and the remaining are 180 pages, i.e., 90 sheets are yet to be printed. Because this number exceeds the maximum dischargeable number of sheets, as above, the client terminal (CL1 to CLn) transmits print data for one side of the maximum dischargeable number of sheets to print it at the printer (Pr1 to Prm), and transmits print data for the other side to print it at the printer (Pr1 to Prm) (steps S107 and S108).

upon completion of transmission of the print data of the other side, the client terminal (CL1 to CLn) sets the number of new sheets to be printed by subtracting the maximum dischargeable number of sheets from the sheets to be printed (step S109). Returning to step S106, the client terminal (CL1 to CLn) checks whether the number of sheets to be printed exceeds the maximum dischargeable number of sheets (step S106).

At this point, 240 sheets (480 pages) out of the total of 250 sheets (500 pages) to be printed has been printed, and the remaining are 20 pages, i.e., 10 sheets are yet to be printed. Because this number is less than the maximum dischargeable number of sheets, the client terminal (CL1 to CLn) continuously transmits print data of the remaining pages for one side of sheets to be printed to print it at the printer (Pr1 to Prm), and transmits print data of the remaining pages for the other side to print it at the printer (Pr1 to Prm) (steps S110 and S111).

Figure 9:
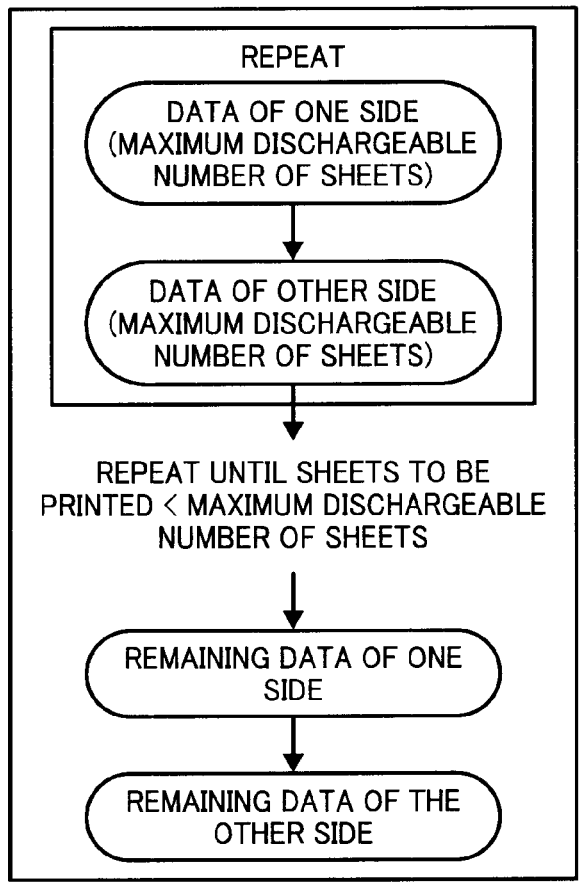
Figure 10:
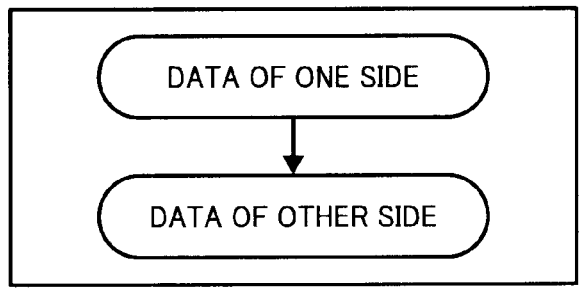
FIG. 10 is a schematic diagram for explaining data transmission upon manual double-sided printing according to a conventional technology.

FIG. 9 is a schematic diagram for explaining data reception sequence and printing sequence upon manual double-sided printing where the client terminal (CL1 to CLn) sets the maximum dischargeable number of sheets. The client terminal (CL1 to CLn) sets the maximum dischargeable number of sheets and manages print data to be transmitted. As shown in FIG. 9, the client terminal (CL1 to CLn) transmits print data of one side for printing of one side, print data of the other side for printing of the other side, . . . (continued) up to the maximum dischargeable number of sheets (steps S106 to S109) until the number of remaining sheets to be printed becomes less than the maximum dischargeable number of sheets. When the number of sheets to be printed becomes less than the maximum dischargeable number of sheets, the client terminal (CL1 to CLn) transmits print data for one side of the remaining sheets to print one side, and then transmits print data for the other side to print the other side.

In an example of FIG. 9, the client terminal (CL1 to CLn) sets the maximum dischargeable number of sheets by separately transmitting print data according to the maximum dischargeable number of sheets. The client terminal (CL1 to CLn) can also set the maximum dischargeable number of sheets by, as shown in FIG. 8, transmitting all print data of one side (odd pages) with information indicating the end position of one-side printing added to the end of the print data for one side. Upon completion of transmission of all the print data for one side, all print data for the other side (even pages) is transmitted. Then, the printer (Pr1 to Prm) receives and stores therein the print data in this sequence, and divides the print data divided into those corresponding the maximum dischargeable number of sheets to separately print sets of divided print data.

As described above, according to the embodiment, the data obtaining unit 52 of the printer (Pr1 to Prm) obtains, from print data stored in the storage unit 51, print data of pages equal to or less than the maximum number of sheets dischargeable to the discharge tray as print data to be printed. The engine 41 continuously prints the obtained print data of odd pages on one side of sheets fed from the feed tray, and discharges the sheets onto the discharge tray. Then, on the other side of the sheets with one side already printed that are manually returned to the feed tray from the discharge tray, the engine 41 continuously prints print data of even pages to be printed.

Therefore, in manual double-sided printing, both sides of sheets can be properly printed in the sequence, while already-printed sheets are prevented from overflowing and sliding out from the discharge tray. Thus, usability can be improved, and the security of information can be ensured.

The data obtaining unit 52 obtains, from the storage unit 51, print data of continuous odd pages corresponding to sheets equal to or less than the maximum dischargeable number of sheets as the print data to be printed. After printing the print data of the odd pages on one side of sheets, the data obtaining unit 52 obtains print data of even pages to be printed on the other side of the sheets as the print data to be printed.

Therefore, in manual double-sided printing, the printing unit 54 and the engine 41 performs printing in the sequence of the print data obtained by the data obtaining unit 52. Thus, both sides of sheets can be properly printed in the sequence, while the already-printed sheets can be reliably and properly prevented from overflowing and sliding out from the discharge tray.

In the manual double-sided printing, in response to an instruction to print even pages after printing print data of odd pages, the engine 41 prints the even pages. That is, it is possible to start printing the even pages on the other side of sheets with one side already printed after it is confirmed that the sheets on the discharge tray have been returned to the feed tray so that the other side is set as the print side. This enables more prope and reliable manual double-sided printing, and the usage and the operability can further be improved.

The printer (Pr1 to Prm) is connected to the client terminal (CL1 to Cln) that transmits print data and print settings via the network NW. The data obtaining unit 52 sets the maximum dischargeable number of sheets depending on the sheet type by referring to the maximum dischargeable sheet information retained by the information managing unit 53 based on the sheet type specified by the print settings.

Therefore, when manual double-sided printing is performed on sheets type of which is specified by a user of the client terminal (CL1 to CLn), the maximum dischargeable number of sheets is set properly. Accordingly, both sides of the sheets can be properly printed in the sequence, while already-printed sheets are reliably and properly prevented the from overflowing and sliding out from the discharge tray.

If the client terminal (CL1 to CLn) sets the maximum dischargeable number of sheets, and separately transmits print data to the printer (Pr1 to Prm) based on the maximum dischargeable number of sheets, functions of the printer (Pr1 to Prm) can be simplified, and the cost of the printer (Pr1 to Prm) can be reduced.

As set forth hereinabove, according to an embodiment of the present invention, in manual double-sided printing, both sides of sheets can be printed in a sequence of pages, while already-printed sheets are prevented from overflowing from a tray. Thus, the usability can be improved, and the security of information can be ensured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus that prints print data on a recording medium fed from a feeding unit and discharges the recording medium printed with the print data onto a discharge tray based on a capacity of the discharge tray, the printing apparatus comprising:
a storage unit that stores therein print data;
an obtaining unit configured to compare a number of sheets of the recording media to be printed corresponding to the stored print data to a threshold that corresponds to the capacity of the discharge tray, and to obtain, from the print data stored in the storage unit, print data of pages corresponding to a number of sheets of the recording media equal to the threshold as target print data, when the number of sheets to be printed exceeds the threshold, the target print data including first print data of odd pages and second print data of even pages; and
a printing unit configured to sequentially print the first print data on a first side of recording media, to discharge the recording media onto the discharge tray, and to sequentially print the second print data on a second side of the recording media manually returned from the discharge tray to the feeding unit,
wherein the obtaining unit is configured to subtract the threshold from the number of sheets to be printed to obtain a subtracted value, when the number of sheets to be printed exceeds the threshold, to repeatedly obtain additional target print data when the subtracted value exceeds the threshold, and to cause the printing unit to print the first and second print data, until the subtracted value is less than the threshold.

2. The printing apparatus according to claim 1, wherein the obtaining unit is configured to obtain the first print data, and, after the printing unit prints the first print data, to obtain the second print data.

3. The printing apparatus according to claim 1, wherein the printing unit is configured to print, after printing the first print data, the second print data in response to a print command for the second print data.

4. The printing apparatus according to claim 1 further comprising:
a communicating unit that is connected via a predetermined line to a terminal, and is configured to receive the print data and print setting from the terminal; and
a setting unit configured to set the threshold depending on a recording medium type specified by the print setting received from the terminal, wherein
the storage unit stores therein the print data received from the terminal.

5. A printing method applied to a printing apparatus that prints print data on a recording medium fed from a feeding unit and discharges the recording medium printed with the print data onto a discharge tray based on a capacity of the discharge tray, the printing method comprising:
storing print data;
comparing a number of sheets of the recording media to be printed corresponding to the stored print data to a threshold that corresponds to the capacity of the discharge tray;
obtaining, from the print data stored in the storage unit, print data of pages corresponding to a number of sheets of the recording media equal to the threshold as target print data, when the number of sheets to be printed exceeds the threshold, the target print data including first print data of odd pages and second print data of even pages;
first printing the first print data on a first side of the recording media;
discharging the recording media onto the discharge tray;
second printing the second print data on a second side of the recording media manually returned from the discharge tray to the feeding unit;
subtracting the threshold from the number of sheets to be printed to obtain a subtracted value, when the number of sheets to be printed exceeds the threshold; and repeating the comparing obtaining, first printing, discharging, second printing, and subtracting steps using the subtracted value, until the subtracted value is less than the threshold.

6. The printing method according to claim 5, wherein the obtaining step includes obtaining the first print data, and, after the first print data is printed in the first printing step, obtaining the second print data.

7. The printing method according to claim 5, wherein the second printing step includes printing, after the first print data is printed in the first printing step, the second print data in response to a print command for the second print data.

8. The printing method according to claim 5, further comprising:
    receiving the print data and print setting from an external terminal via a predetermined line; and
    setting the threshold depending on a recording medium type specified by the print setting received from the external terminal, wherein
    the storing step includes storing the print data received from the external terminal.

\* \* \* \* \*